No. 688,058. Patented Dec. 3, 1901.
E. K. BROWN.
INSTRUMENT FOR MEASURING THE RESISTANCE OF ELECTRIC CIRCUITS.
(Application filed Apr. 1, 1901.)
(No Model.)
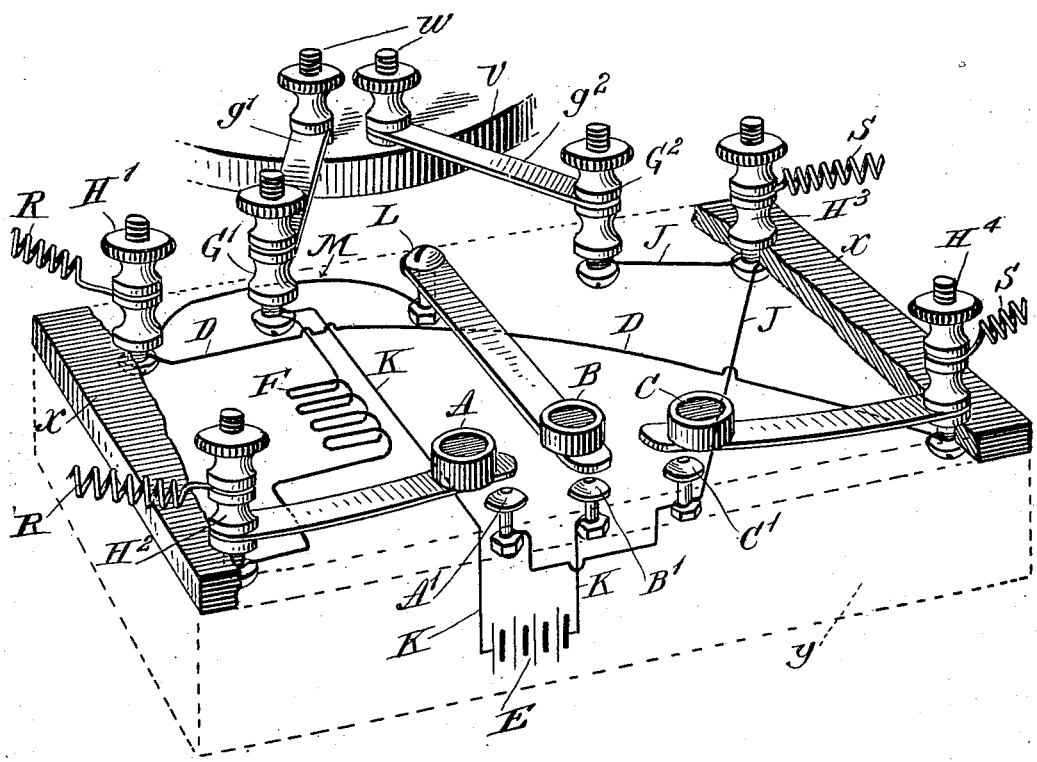

UNITED STATES PATENT OFFICE.

EDWARD K. BROWN, OF SPRINGFIELD, MASSACHUSETTS.

INSTRUMENT FOR MEASURING THE RESISTANCE OF ELECTRIC CIRCUITS.

SPECIFICATION forming part of Letters Patent No. 688,058, dated December 3, 1901.

Application filed April 1, 1901. Serial No. 53,797. (No model.)

*To all whom it may concern:*

Be it known that I, EDWARD K. BROWN, a citizen of the United States of America, residing at Springfield, in the county of Hampden and State of Massachusetts, have invented new and useful Improvements in Instruments for Measuring the Resistance of Electric Circuits, of which the following is a specification.

This invention relates to instruments for measurement of electrical resistance, the object of the invention being to provide in a compact and portable form an instrument for the above purpose whereby either one of two well-known methods may be employed for determining said resistance. These two methods are known one as the "fall-of-potential" or "drop" method and the other as the "current" method. In the first of these methods the drop across the resistance to be determined is compared with the drop across a known resistance, and in the second method, which is used more particularly to measure high resistances, the current flowing through a known resistance is compared with the current when the unknown resistance to be determined is inserted in series therewith. All of the apparatus being employed for the determination of resistances by the drop method referred to, the specification is directed and the claims drawn mainly to the device as thus employed. The use of the instrument for the measurement of resistance by the current method is also given as more clearly emphasizing the capabilities of the invention; and the invention consists in the construction described in the following specification and clearly pointed out in the claims.

The drawing consists of a perspective view of a device embodying this invention, in which the flat plate of insulating material on which the various circuits are supported is shown broken away. The drawing also shows in dotted lines a box of which said plate forms the cover, which box serves to inclose said circuits and a suitable portable battery.

A portion of a galvanometer only is shown in the drawing.

Referring now to the drawing, $xx$ indicate a plate of insulating material, such as wood or hard rubber or similar substance, which forms a cover for a box-like body $y$. (Indicated in the drawing by dotted lines.) On said plate near one end thereof are mounted two binding-posts $H'$ $H^2$, to which are attached the two terminals of a circuit R, whose resistance is to be measured under the above-named drop method. On the opposite end of said plate $x$ are two binding-posts $H^3$ and $H^4$, similar in all respects to said first-named binding-posts, and to these posts $H^3$ and $H^4$ may be connected the terminals of a circuit S, whose resistance is to be determined by said second or current method. To the posts $H^2$ and $H^4$ two keys A and C are secured, which are of metal and extend toward the center of the plate $x$, their ends lying over and normally out of contact with the contact-points $A'$ and $C'$. Between these contact-points is located a third one, (indicated by $B'$,). From a point on the side of the plate $x$ opposite to the contact-point $B'$ is a post to which a third key B is secured, whose free end lies over the contact-point $B'$. On that side of the said plate $x$ opposite to the said contact-points are two binding-posts $G'$ and $G^2$, to which are attached two swinging metal arms $g'$ and $g^2$, whereby connections may be made with the binding-posts $w$ of a galvanameter $v$. Between the posts $G'$ and $H^2$ and connected therewith is the resistance F. It will be assumed that this resistance equals a certain unit of measure—say one ohm. From said binding-post $G'$ a line K runs to one pole of the battery E and from thence to the contact-post $B'$. From the post $G^2$ a line J runs to the post $H^3$, thence to the contact-point $C'$, and thence to the contact-point $A'$. A line (indicated by D) runs from the post $H'$ to the post $H^4$ and a line M from post $H'$ to the post L, by which the key B is secured. This completes the various circuits.

The battery E may be of any suitable type, but the one generally used is the well-known chlorid-of-silver dry battery.

In operating this instrument to determine the resistance, for example, of a circuit R the instrument is first connected, by means of the arms $g'$ and $g^2$, with the binding-posts $w$ $w$ of the galvanometer $v$. The terminals of the circuit R are then secured to the binding-posts $H'$ and $H^2$. Now by pressing the key B the battery-circuit will be completed and the current from the battery will flow through the line K, the key, the line M, to the post H', thence through the line R, whose resistance is to be determined, the resistance F, and from thence through K to the battery. It is thus seen that the line R and the resistance F are connected in this circuit in series. It will also be noted that the post G', to which one end of resistance F is connected in the above-named circuit, is also connected by the arm $g'$ with one of the posts $w$ of the galvanometer $v$. Now while holding down the key B if the key C is depressed a shunt-current will flow from post H' through the line D to the key C and from thence through the line J to the binding-post $G^2$, which, by means of the arm $g^2$, is connected with the other post $w$ of the galvanometer. With these two keys held down to their contact-points the galvanometer will give a reading whose value depends upon the drop between the posts G' and H', containing the known resistance F and line R connected in series, as stated. If now the key C be released and the key A depressed, a shunt-current will flow from the post $H^2$ through the key A, line J, post $G^2$, arm $g^2$, to the other post $w$ of the galvanometer $v$, whose value depends on the drop between the posts G' and $H^2$, which contain the known resistance F only. As the resistance of any part of a circuit carrying the same current is proportional to the drop between the terminals of that part, a comparison of the combined resistance of R and F with F only is obtained, and the resistance of R is found by deducting the known resistance F.

The above-described method is, as has been stated, usually the one which is employed for determining low resistances.

The instrument may also be used to determine higher resistances by the current method referred to, if desired, in which case the terminals of the circuit would be secured, respectively, to the posts $H^3$ $H^4$, and if the battery-key B be then depressed the current will flow from the battery E through line K, the key B, line M, post H', line D to $H^4$, thence through the circuit S to $H^3$, line J, through the galvanometer, and thence through K to the key again. The galvanometer will thus indicate a current flowing whose value depends upon the total resistance of the circuit, the known part consisting of the galvanometer and battery and the unknown resistance of line S. If now the key C be depressed while B is still in contact with B', the line S will be short-circuited, the current passing through the line M from B, through line D to the key C, and through C' and the line J to the galvanometer by means of the before-described connections $g^2$. Its value depends upon the resistance of the known portion only of the circuit. As the resistance of a circuit depends, inversely, upon the current flowing, (the electromotive force being constant,) the total resistance will be to the known part as the current through the known part is to the current through the total. Subtracting the known resistance gives the resistance required.

From the above description it is apparent that the instrument described may be used with equal facility to determine resistances by either of the above-mentioned methods, the whole being in a compact and portable form. When not attached to a galvanometer, the arms $g'$ and $g^2$ fold in between the posts G' and $G^2$ and may be held in that position by tightening up the nuts on said post.

No reference has been made to the resistance of the various connections between the battery and galvanometer and various keys or switches, for said resistance is too small to take into account.

Having thus described my invention, what I claim, and desire to secure by Letters Patent of the United States, is—

1. In an instrument for measuring electrical resistance, a battery-circuit comprising a battery, a switch or key, a known resistance, terminals for the inclusion of resistance to be measured; a galvanometer-circuit, one end of which is directly connected to the battery end of the known resistance, comprising terminals for the inclusion of a galvanometer, and switches or keys through which it may be connected in shunt to various parts of the battery-circuit, substantially as described.

2. In an instrument for measuring resistance, a battery-circuit comprising a battery, a switch or key, terminals for the inclusion of a galvanometer, terminals for the inclusion of resistance to be measured, and a switch or key for short-circuiting the terminals of resistance to be measured, substantially as described.

3. In an instrument for the measurement of electrical resistance, a battery, a battery key or switch, two branches leading from said switch, one including a known resistance, and terminals for the inclusion of unknown resistance to be measured, and having keys or switches A, C, connected to the ends of known and unknown resistances respectively, for closing a shunt-circuit through a galvanometer; the second branch having terminals for the inclusion of said galvanometer, terminals for the inclusion of the resistance to be measured, and a key C for short-circuiting the latter, substantially as described.

4. In an instrument for measuring electrical resistance, the combination with binding-posts in the branches of the galvanometer-circuit, of strap-terminals for connection to the galvanometer which are pivoted to said binding-posts and adapted to be folded up when disconnected from the galvanometer, substantially as described.

5. An instrument for measuring electrical resistance comprising a base, a pair of terminal binding-posts for connection to unknown low resistances to be measured, a pair of terminal binding-posts for connection to unknown high resistances to be measured, a pair of terminal binding-posts for connection to a galvanometer, a spring-strap battery-key in circuit with one of the low-resistance terminal posts, a spring-strap key directly connected to the other low-resistance terminal post, a connection between the first-named low-resistance terminal post and one of the high-resistance terminal posts, a spring-strap key directly connected to the last-named high-resistance post, a known resistance connected to the other low-resistance terminal post, and to one of the galvanometer terminal posts, a contact-point for the battery-key, and a battery-circuit connecting it to the galvanometer-post to which the known resistance is connected, connected contact-points for the other strap-keys, and a connection between said contact-points last named, and the other high-resistance post and remaining galvanometer-post, substantially as described.

EDWARD K. BROWN.

Witnesses:
WM. H. CHAPIN,
J. D. GARFIELD.